United States Patent
Yang et al.

(10) Patent No.: US 9,652,825 B2
(45) Date of Patent: May 16, 2017

(54) IMAGE ENLARGEMENT METHOD AND APPARATUS

(71) Applicant: Huawei Technologies Co., Ltd., Shenzhen, Guangdong (CN)

(72) Inventors: Xiaowei Yang, Hangzhou (CN); Xin Li, Hangzhou (CN); Jinsheng Xiao, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 381 days.

(21) Appl. No.: 14/503,948

(22) Filed: Oct. 1, 2014

(65) Prior Publication Data

US 2015/0187048 A1 Jul. 2, 2015

(30) Foreign Application Priority Data

Dec. 31, 2013 (CN) .......................... 2013 1 0754087

(51) Int. Cl.
 *G09G 5/10* (2006.01)
 *G06T 3/40* (2006.01)
(52) U.S. Cl.
 CPC ............ *G06T 3/4007* (2013.01); *G06T 3/403* (2013.01); *G06T 3/4061* (2013.01); *G06T 3/4069* (2013.01); *G06T 3/4076* (2013.01)
(58) Field of Classification Search
 CPC ... G06T 7/0085; G06T 7/0079; G06T 3/4007; G06T 3/4061; G06T 3/4069; G06T 3/4076
 See application file for complete search history.

(56) References Cited

U.S. PATENT DOCUMENTS

2010/0260435 A1 10/2010 Orlick

FOREIGN PATENT DOCUMENTS

| CN | 101271571 A | 9/2008 |
|---|---|---|
| CN | 101903907 A | 12/2010 |
| CN | 103034973 A | 4/2013 |

(Continued)

OTHER PUBLICATIONS

Freeman et al., "Example-Based Super-Resolution", Apr. 2002, Mitsubishi Electric Research Labs, 56-65.*

(Continued)

*Primary Examiner* — Robert Craddock

(57) ABSTRACT

The present application discloses an image enlargement method and apparatus. The method includes: inputting a low-resolution image, where the low-resolution image includes at least one matching areas; searching one of the matching areas for an optimal contour template, where the optimal contour template is a contour template with a minimum total variation value in the matching area and the contour template set; finding a second pixel point according to a zoom ratio and a first pixel point in the matching area; performing local interpolation for the second pixel point according to the optimal contour template, so as to obtain an intermediate pixel value; repeating the foregoing steps until processing for all the matching areas is complete, and obtaining an initial high-resolution image according to all of the intermediate pixel values; and performing global interpolation for the initial high-resolution image to obtain a high-resolution image.

20 Claims, 4 Drawing Sheets

(56) References Cited

FOREIGN PATENT DOCUMENTS

EP        0 677 821 A2    10/1995
WO    WO 2009/085833 A1    7/2009

OTHER PUBLICATIONS

Joshi et al., "Super-resolution imaging: use of zoom as a cue", Image and Vision Computing Dec. 22, 2004, 1185-1196.*
Mei-fang Xu, et al., "Super-Resolution Image Reconstruction of Aerial Photography Based on Projection onto Convex Sets", Chinese Journal of Liquid Crystals and Displays, vol. 25, No. 6, Dec. 2010, 5 pages.
Y. T. Zhou, et al., "Edge Detection and Linear Feature Extraction Using a 2-D Random Field Model", IEEE Transactions on Pattern Analysis and Machine Intelligence, vol. 11, No. 1, Jan. 1, 1989, p. 84-95.
Jan Allebach, et al., "Edge-Directed Interpolation", Proceedings of the International Conference on Image Processing, Sep. 16, 1996, p. 707-710.
Ernst E. Triendl, "How to Get the Edge Into the Map", Proceedings of the International Joint Conference on Pattern Recognition, Nov. 7-10, 1978, p. 946-950.
Pascal Getreuer, "Contour Stencils: Total Variation along Curves for Adaptive Image Interpolation", SIAM J. Images Sciences, vol. 4, No. 3, Sep. 29, 2011, pp. 954-979.

* cited by examiner

Edge of an image       Gradient of an image

IMAGE ENLARGEMENT METHOD AND APPARATUS

CROSS-REFERENCE TO RELATED APPLICATIONS

This application claims priority to Chinese Patent Application No. 201310754087.7, filed with the Chinese Patent Office on Dec. 31, 2013, which is incorporated herein by reference in its entirety.

TECHNICAL FIELD

The present application relates to the image processing field, and in particular, to an image enlargement method and apparatus.

BACKGROUND

Nowadays, more and more electronic devices support high-resolution displays, so that a small original image must be enlarged to ensure that the image can fit a high-resolution display of an electronic device.

The prior art provides an image enlargement method, in which a multiple of enlarging a low-resolution image is obtained first to obtain a zoom ratio, then an interpolation point that is in the original image and is corresponding to a to-be-interpolated pixel point in a high-resolution image is calculated according to the zoom ratio, and finally a pixel value of the to-be-interpolated pixel point corresponding to the interpolation point is calculated by using an interpolation method according to a pixel value of a pixel point in a neighbor area of the interpolation point.

As shown in FIG. 1, that interpolation is performed by using the Lanczos function is used as an example, where a horizontal distance from an interpolation point m to the nearest pixel point p6 in the upper left corner is a, and a perpendicular distance is b. A pixel value of the interpolation point m can be calculated according to the following:

Value1=$p1$*LUT(1+$b$)+$p5$*LUT($b$)+$p9$*LUT(1−$b$)+$p13$*LUT(2−$b$)

Value2=$p2$*LUT(1+0+$p6$*LUT($b$)+$p10$*LUT(1−$b$)+$p14$*LUT(2−$b$)

Value3=$p3$*LUT(1+0+$p7$*LUT($b$)+$p11$*LUT(1−$b$)+$p15$*LUT(2−$b$)

Value4=$p4$*LUT(1+$b$)+$p8$*LUT($b$)+$p12$*LUT(1−$b$)+$p16$*LUT(2−$b$)

$m$=Value1*LUT(1+$a$)+Value2*LUT($a$)+Value3*LUT(1−$a$)+Value4*LUT(2−$a$)

where p1 to p are 4×4 pixel points adjacent to the interpolation point m, for convenience, p1 to p16 in the formulas) also indicate pixel values of the pixel points, LUT( ) is the Lanczos function, a perpendicular distance from p1 to the interpolation point m is 1+b, and therefore a parameter of the Lanczos function in p1*LUT(1+b) is 1+b. Similarly, parameters of the Lanczos function can also be determined according to vertical distances from p2 to p16 pixel points to the interpolation point m. Value1 is an intermediate variable calculated according to the first column of pixel points, and similarly, Value2 to Value4 are intermediate variables calculated according to corresponding columns. A horizontal distance from the column corresponding to Value1 to the interpolation point m is 1+a. Therefore, a parameter of the Lanczos function in Value1*LUT(1+a) is 1+a, and similarly, parameters of the Lanczos function corresponding to Value2 to Value4 can also be determined. Therefore, it is necessary to know only a horizontal distance and a perpendicular distance from an interpolation point to the nearest pixel point in the upper left corner and pixel values of pixel points adjacent to the interpolation point, a pixel value of the interpolation point can be obtained through calculation.

However, in this method, if a multiple of enlarging an image is relatively large (generally exceeding three times), too much high-frequency information may get lost due to a function of a low-pass filter, and therefore a high-resolution image appears to be blurry.

SUMMARY

The present application provides an image enlargement method and apparatus, which can enlarge an image and improve definition of the image after enlargement.

According to a first aspect, the present application provides an image enlargement method, including the following steps: inputting a low-resolution image, where the low-resolution image includes at least one matching areas and the matching areas are used to match all contour templates in a contour template set; searching one of the matching areas for an optimal contour template, where the optimal contour template is a contour template with a minimum total variation value in the matching area and the contour template set; finding a second pixel point according to a zoom ratio and a first pixel point in the matching area, where the second pixel point is corresponding to the first pixel point; performing local interpolation for the second pixel point according to the optimal contour template, so as to obtain an intermediate pixel value; repeating the foregoing steps until processing for all the matching areas is complete, and obtaining an initial high-resolution image according to all of the intermediate pixel values; and performing global interpolation for the initial high-resolution image to obtain a high-resolution image.

With reference to the first aspect, in a first possible implementation manner of the first aspect of the present application, the step of performing local interpolation for the second pixel point according to the optimal contour template includes: calculating an oriented function of an interpolation of the second pixel point according to an optimal contour template of a matching area of the first pixel point corresponding to the second pixel point; and performing the local interpolation for the second pixel point according to the oriented function of the interpolation of the second pixel point.

With reference to the first possible implementation manner of the first aspect, in a second possible implementation manner of the first aspect of the present application, the step of calculating an oriented function of an interpolation of the second pixel point according to an optimal contour template of a matching area of the first pixel point corresponding to the second pixel point is specifically: calculating a direction angle function $\theta_S^n$ and an anisotropy function $u_S$ of the second pixel point according to the optimal contour template of the matching area of the first pixel point corresponding to the second pixel point, where the oriented function $\rho_{s*(k)}^n$ is indicated by the direction angle function $\theta_S^n$ and the anisotropy function $u_S$, $$\theta_S^n = L \int \nabla \varphi_S^{\perp}(k-n)dx$$

-continued $$u_S = \min_{n \in N} \left| \int \nabla \varphi_S(k-n) dx \right|$$

where $\phi_S$ is the optimal contour template, $\nabla \phi_S^\perp$ indicates that $\phi_S$ is projected to a first axis and a second axis that are perpendicular to each other and then gradients are separately calculated in the directions of the first axis and the second axis that are perpendicular to each other, k is the first pixel point, N indicates a pixel point set in a neighbor area of the pixel point k, and n is a pixel point in the pixel point set.

With reference to the first possible implementation manner of the first aspect, in a third possible implementation manner of the first aspect of the present application, the step of performing the local interpolation for the second pixel point according to the oriented function of the interpolation of the second pixel point specifically includes: performing the local interpolation for the second pixel point according to $$u_k(x) = v_k + \sum_{n \in N} c_n \rho_{s^*(k)}^n (x-n),$$

where x is the second pixel point, k is the first pixel point, $u_k(x)$ is the intermediate pixel value of the second pixel point, $v_k$ is a pixel value of the first pixel point, N is a pixel point set in a neighbor area of x, n is a pixel point in the pixel point set, $c_n$ is an interpolation coefficient, and $\rho_{s^*(k)}^n$ is an oriented function of an interpolation pixel point when an optimal contour template S*( ) is used.

With reference to the first aspect, in a fourth possible implementation manner of the first aspect of the present application, the step of performing global interpolation for the initial high-resolution image to obtain a high-resolution image includes: performing the global interpolation according to the formula $$u(x) = \sum_{k \in \square^2} w(x-k) u_k(x-k),$$

where x is the second pixel point, u(x) is a final pixel value of the second pixel point after the global interpolation, k is a pixel point in a neighbor area $\square^2$ of the pixel point x, w(x−k) is a weight value of a pixel point x−k, and $u_k$ (x−k) is an intermediate pixel value of the pixel point x−k.

With reference to the first aspect, in a fifth possible implementation manner of the first aspect of the present application, after the step of performing global interpolation for the initial high-resolution image to obtain a high-resolution image, the method further includes: optimizing the high-resolution image after the global interpolation according to a gradient contour variance of the high-resolution image after the global interpolation and a gradient contour variance of the low-resolution image, so as to obtain an optimized high-resolution image.

With reference to the fifth possible implementation manner of the first aspect, in a sixth possible implementation manner of the first aspect of the present application, the step of optimizing the high-resolution image after the global interpolation according to a gradient contour variance of the high-resolution image after the global interpolation and a gradient contour variance of the low-resolution image includes: obtaining a change rate according to the gradient contour variance of the high-resolution image after the global interpolation and the gradient contour variance of the low-resolution image; obtaining, through calculation, a target gradient field according to an original gradient field of the high-resolution image after the interpolation and the change rate; reconstructing the high-resolution image after the global interpolation according to the target gradient field, so as to obtain an initial reconstructed high-resolution image; and compensating for a high-resolution image before iteration according to a difference between a downsampling image of the high-resolution image before the iteration and the low-resolution image, so as to obtain a high-resolution image after the iteration, and after many times of iteration, obtaining the optimized high-resolution image, where an initial image of the high-resolution image before the iteration is the initial reconstructed high-resolution image.

With reference to the sixth possible implementation manner of the first aspect, in a seventh possible implementation manner of the first aspect of the present application, the step of obtaining a change rate according to the gradient contour variance of the high-resolution image after the global interpolation and the gradient contour variance of the low-resolution image includes: obtaining the change rate according to $$r(d) = \frac{\sigma_H}{\sigma_L},$$

where r(d) is the change rate, $\sigma_H$ is the gradient contour variance of the high-resolution image after the global interpolation, and $\sigma_L$ is the gradient contour variance of the low-resolution image.

With reference to the seventh possible implementation manner of the first aspect, in an eighth possible implementation manner of the first aspect of the present application, the step of obtaining, through calculation, a target gradient field according to an original gradient field of the high-resolution image after the interpolation and the change rate includes: obtaining, through calculation, the target gradient field according to $\nabla I_t^T = r(d) \cdot \nabla I_s$, where $\nabla I_t^T$ is the target gradient field, r(d) is the change rate, and $\nabla I_s$ is the original gradient field of the high-resolution image after the interpolation.

With reference to the eighth possible implementation manner of the first aspect, in a ninth possible implementation manner of the first aspect of the present application, the step of reconstructing the high-resolution image after the global interpolation according to the target gradient field includes: reconstructing the high-resolution image after the global interpolation according to $$I_H^{t_0} = w \cdot \frac{dx + dy}{2} + I_H,$$

where $I_H^{t_0}$ is the initial reconstructed high-resolution image, w is weight, dx and dy are direction gradients of $\nabla I_t^T$ on a first axis and a second axis, respectively, and $I_H$ is the high-resolution image after the global interpolation.

With reference to the ninth possible implementation manner of the first aspect, in a tenth possible implementation manner of the first aspect of the present application, the step of compensating for a high-resolution image before iteration according to a difference between a downsampling image of the high-resolution image before the iteration and the low-resolution image, so as to obtain a high-resolution image after the iteration includes: compensating for the high-resolution image before the iteration according to the formula $I_H^{t+1}=I_H^t+\tau\cdot((I_H^t*G)\downarrow-I_l)\uparrow*G$, where $I_H^{t+1}$ is the high-resolution image after the iteration, $I_H^t$ is the high-resolution image before the iteration, an initial value of $I_H^t$ is $I_H^{t0}$, $\tau$ is an iteration step size, G is the Gaussian kernel, $I_l$ is the low-resolution image, $\downarrow$ is downsampling, and $\uparrow$ is upsampling.

According to a second aspect, the present application provides an image enlargement apparatus, including: an input module, a searching module, a corresponding module, a local interpolation module, and a global interpolation module, where the input module is configured to input a low-resolution image, where the low-resolution image includes at least one matching areas and the matching areas are used to match all contour templates in a contour template set, and the input module sends the low-resolution image to the searching module and the corresponding module; the searching module is configured to search one of the matching areas for an optimal contour template, where the optimal contour template is a contour template with a minimum total variation value in the matching area and the contour template set, and the searching module sends the optimal contour template to the local interpolation module; the corresponding module is configured to receive the low-resolution image and find a second pixel point according to a zoom ratio and a first pixel point in the matching area, where the second pixel point is corresponding to the first pixel point, and the corresponding module sends the second pixel point to the local interpolation module; the local interpolation module is configured to receive the optimal contour template and the second pixel point, perform local interpolation for the second pixel point according to the optimal contour template, so as to obtain an intermediate pixel value, and obtain an initial high-resolution image according to all of the intermediate pixel values; and the global interpolation module is configured to receive the intermediate pixel values and perform global interpolation for the initial high-resolution image to obtain a high-resolution image.

With reference to the second aspect, in a first possible implementation manner of the second aspect of the present application, the local interpolation module is configured to: calculate an oriented function of an interpolation of the second pixel point according to an optimal contour template of a matching area of the first pixel point corresponding to the second pixel point; and perform the local interpolation for the second pixel point according to the oriented function of the interpolation of the second pixel point.

With reference to the first possible implementation manner of the second aspect, in a second possible implementation manner of the second aspect of the present application, the local interpolation module is configured to calculate a direction angle function $\theta_S^n$ and an anisotropy function $u_S$ of the second pixel point according to the optimal contour template of the matching area of the first pixel point corresponding to the second pixel point, where the oriented function $\rho_{s*(k)}^n$ is indicated by the direction angle function $\theta_S^n$ and the anisotropy function $u_S$, $$\theta_S^n = \angle \int \nabla\varphi_S^\perp(k-n)dx$$

$$u_S = \min_{n\in N}\left|\int \nabla\varphi_S(k-n)dx\right|$$

where $\phi_S$ is the optimal contour template, $\nabla\phi_S^\perp$ indicates that $\phi_S$ is projected to a first axis and a second axis that are perpendicular to each other and then gradients are separately calculated in the directions of the first axis and the second axis that are perpendicular to each other, k is the first pixel point, N indicates a pixel point set in a neighbor area of the pixel point k, and n is a pixel point in the pixel point set.

With reference to the first possible implementation manner of the second aspect, in a third possible implementation manner of the second aspect of the present application, the local interpolation module is configured to perform the local interpolation for the second pixel point according to $$u_k(x) = v_k + \sum_{n\in N} c_n \rho_{s*(k)}^n(x-n),$$

where x is the second pixel point, k is the first pixel point, $u_k(x)$ is the intermediate pixel value of the second pixel point, $v_k$ is a pixel value of the first pixel point, N is a pixel point set in a neighbor area of x, n is a pixel point in the pixel point set, $c_n$ is an interpolation coefficient, and $\rho_{s*(k)}^n$ is an oriented function of an interpolation pixel point when an optimal contour template S*( ) is used.

With reference to the second aspect, in a fourth possible implementation manner of the second aspect of the present application, the local interpolation module is configured to perform the global interpolation according to the formula $$u(x) = \sum_{k\in\square^2} w(x-k)u_k(x-k),$$

where x is the second pixel point, u(x) is a final pixel value of the second pixel point after the global interpolation, k is a pixel point in a neighbor area $\square^2$ of the pixel point x, w(x−k) is a weight value of a pixel point x−k, and $u_k$(x−k) is an intermediate pixel value of the pixel point x−k.

With reference to the second aspect, in a fifth possible implementation manner of the second aspect of the present application, the apparatus further includes an optimizing module, where the optimizing module is configured to optimize the high-resolution image after the global interpolation according to a gradient contour variance of the high-resolution image after the global interpolation and a gradient contour variance of the low-resolution image, so as to obtain an optimized high-resolution image.

With reference to the fifth possible implementation manner of the second aspect, in a sixth possible implementation manner of the second aspect of the present application, the optimizing module is configured to: obtain a change rate according to the gradient contour variance of the high-resolution image after the global interpolation and the gradient contour variance of the low-resolution image; obtain, through calculation, a target gradient field according to an original gradient field of the high-resolution image after the interpolation and the change rate; reconstruct the high-resolution image after the global interpolation according to the target gradient field, so as to obtain an initial reconstructed high-resolution image; and compensate for a high-resolution image before iteration according to a difference between a downsampling image of the high-resolution image before the iteration and the low-resolution image, so as to obtain a high-resolution image after the iteration, and after many times of iteration, obtain the optimized high-resolution image, where an initial image of the high-resolution image before the iteration is the initial reconstructed high-resolution image.

With reference to the sixth possible implementation manner of the second aspect, in a seventh possible implementation manner of the second aspect of the present application, the optimizing module is configured to obtain the change rate according to $$r(d) = \frac{\sigma_H}{\sigma_L},$$

where r(d) is the change rate, $\sigma_H$ is the gradient contour variance of the high-resolution image after the global interpolation, and $\sigma_L$ is the gradient contour variance of the low-resolution image.

With reference to the seventh possible implementation manner of the second aspect, in an eighth possible implementation manner of the second aspect of the present application, the optimizing module is configured to obtain, through calculation, the target gradient field according to $\nabla I_t^T = r(d) \cdot \nabla I_s$, where $\nabla I_t^T$ is the target gradient field, r(d) is the change rate, and $\nabla I_s$ is the original gradient field of the high-resolution image after the interpolation.

With reference to the eighth possible implementation manner of the second aspect, in a ninth possible implementation manner of the second aspect of the present application, the optimizing module is configured to reconstruct the high-resolution image after the global interpolation according to $$I_H^{t0} = w \cdot \frac{dx + dy}{2} + I_H,$$

where $I_H^{t0}$ is the initial reconstructed high-resolution image, w is weight, dx and dy are direction gradients of $\nabla I_t^T$ on a first axis and a second axis, respectively, and $I_H$ is the high-resolution image after the global interpolation.

With reference to the ninth possible implementation manner of the second aspect, in a tenth possible implementation manner of the second aspect of the present application, the optimizing module is configured to compensate for the high-resolution image before the iteration according to the formula $I_H^{t+1} = I_H^t + \tau \cdot ((I_H^t * G) \downarrow - I_l) \uparrow * G$, where $I_H^{t+1}$ is the high-resolution image after the iteration, $I_H^t$ is the high-resolution image before the iteration, an initial value of $I_H^t$ is $I_H^{t0}$, $\tau$ is an iteration step size, G is the Gaussian kernel, $I_l$ is the low-resolution image, $\downarrow$ is downsampling, and $\uparrow$ is upsampling.

According to a third aspect, the present application provides an image enlargement apparatus, including an input device, a processor, and an output device, where the input device is configured to input a low-resolution image, where the low-resolution image includes at least one matching areas and the matching areas are used to match all contour templates in a contour template set; the processor is configured to: search one of the matching areas for an optimal contour template, where the optimal contour template is a contour template with a minimum total variation value in the matching area and the contour template set; find a second pixel point according to a zoom ratio and a first pixel point in the matching area, where the second pixel point is corresponding to the first pixel point; perform local interpolation for the second pixel point according to the optimal contour template, so as to obtain an intermediate pixel value, and obtain an initial high-resolution image according to all of the intermediate pixel values; and perform global interpolation for the initial high-resolution image to obtain a high-resolution image; and the output device is configured to output the high-resolution image.

With reference to the third aspect, in a first possible implementation manner of the third aspect of the present application, the processor is configured to: calculate an oriented function of an interpolation of the second pixel point according to an optimal contour template of a matching area of the first pixel point corresponding to the second pixel point; and perform the local interpolation for the second pixel point according to the oriented function of the interpolation of the second pixel point.

With reference to the first possible implementation manner of the third aspect, in a second possible implementation manner of the third aspect of the present application, the processor is configured to calculate a direction angle function $\theta_S^n$ and an anisotropy function $u_S$ of the second pixel point according to the optimal contour template of the matching area of the first pixel point corresponding to the second pixel point, where the oriented function $\rho_{s*(k)}^n$ is indicated by the direction angle function $\theta_S^n$ and the anisotropy function $u_S$, $$\theta_S^n = L \int \nabla \varphi_S^\perp (k-n) dx$$

$$u_S = \min_{n \in N} \left| \int \nabla \varphi_S (k-n) dx \right|$$

where $\phi_S$ is the optimal contour template, $\nabla \phi_S^\perp$ indicates that $\phi_s$ is projected to a first axis and a second axis that are perpendicular to each other and then gradients are separately calculated in the directions of the first axis and the second axis that are perpendicular to each other, k is the first pixel point, N indicates a pixel point set in a neighbor area of the pixel point k, and n is a pixel point in the pixel point set.

With reference to the first possible implementation manner of the third aspect, in a third possible implementation manner of the third aspect of the present application, the processor is configured to perform the local interpolation for the second pixel point according to $$u_k(x) = v_k + \sum_{n \in N} c_n \rho_{s*(k)}^n (x-n),$$

where x is the second pixel point, k is the first pixel point, $u_k(x)$ is the intermediate pixel value of the second pixel point, $v_k$ is a pixel value of the first pixel point, N is a pixel point set in a neighbor area of x, n is a pixel point in the pixel point set, $c_n$ is an interpolation coefficient, and $\rho_{s*(k)}^n$ is an oriented function of an interpolation pixel point when an optimal contour template S*( ) is used.

With reference to the third aspect, in a fourth possible implementation manner of the third aspect of the present application, the processor is configured to perform the global interpolation according to the formula $$u(x) = \sum_{k \in \square^2} w(x-k) u_k(x-k),$$

where x is the second pixel point, u(x) is a final pixel value of the second pixel point after the global interpolation, k is a pixel point in a neighbor area $\square^2$ of the pixel point x, w(x−k) is a weight value of a pixel point x−k, and $u_k$(x−k) is an intermediate pixel value of the pixel point x−k.

With reference to the third aspect, in a fifth possible implementation manner of the third aspect of the present application, the processor is configured to optimize the high-resolution image after the global interpolation according to a gradient contour variance of the high-resolution image after the global interpolation and a gradient contour variance of the low-resolution image, so as to obtain an optimized high-resolution image.

With reference to the fifth possible implementation manner of the third aspect, in a sixth possible implementation manner of the third aspect of the present application, the processor is configured to: obtain a change rate according to the gradient contour variance of the high-resolution image after the global interpolation and the gradient contour variance of the low-resolution image; obtain, through calculation, a target gradient field according to an original gradient field of the high-resolution image after the interpolation and the change rate; reconstruct the high-resolution image after the global interpolation according to the target gradient field, so as to obtain an initial reconstructed high-resolution image; and compensate for a high-resolution image before iteration according to a difference between a downsampling image of the high-resolution image before the iteration and the low-resolution image, so as to obtain a high-resolution image after the iteration, and after many times of iteration, obtain the optimized high-resolution image, where an initial image of the high-resolution image before the iteration is the initial reconstructed high-resolution image.

With reference to the sixth possible implementation manner of the third aspect, in a seventh possible implementation manner of the third aspect of the present application, the processor is configured to obtain the change rate according to $$r(d) = \frac{\sigma_H}{\sigma_L},$$

where r(d) is the change rate, $\sigma_H$ is the gradient contour variance of the high-resolution image after the global interpolation, and $\sigma_L$ is the gradient contour variance of the low-resolution image.

With reference to the seventh possible implementation manner of the third aspect, in an eighth possible implementation manner of the third aspect of the present application, the processor is configured to obtain, through calculation, the target gradient field according to $\nabla I_t^T = r(d) \cdot \nabla I_s$, where $\nabla I_t^T$ is the target gradient field, r(d) is the change rate, and $\nabla I_s$ is the original gradient field of the high-resolution image after the interpolation.

With reference to the eighth possible implementation manner of the third aspect, in a ninth possible implementation manner of the third aspect of the present application, the processor is configured to reconstruct the high-resolution image after the global interpolation according to $$I_H^{t0} = w \cdot \frac{dx + dy}{2} + I_H,$$

where $I_H^{t0}$ is the initial reconstructed high-resolution image, w is weight, dx and dy are direction gradients of $\nabla I_t^T$ on a first axis and a second axis, respectively, and $I_H$ is the high-resolution image after the global interpolation.

With reference to the ninth possible implementation manner of the third aspect, in a tenth possible implementation manner of the third aspect of the present application, the processor is configured to compensate for the high-resolution image before the iteration according to the formula $I_H^{t+1} = I_H^t + \tau \cdot ((I_H^t * G) \downarrow - I_l) \uparrow * G$, where $I_H^{t+1}$ is the high-resolution image after the iteration, $I_H^t$ is the high-resolution image before the iteration, an initial value of $I_H^t$ is $I_H^{t0}$, $\tau$ is an iteration step size, G is the Gaussian kernel, $I_l$ is the low-resolution image, $\downarrow$ is downsampling, and $\nabla$ is upsampling.

In the present application, each matching area is searched for an optimal contour template, and interpolation and enlargement are performed according to the optimal contour template. The optimal contour template includes prior knowledge of a contour in an image, and therefore the optimal contour template is used to perform the interpolation, so that occurrences of phenomena such as blur, spreading, and ringing artifact on an edge of a high-resolution image obtained after the interpolation are significantly reduced, and definition of the image after the enlargement is improved.

Furthermore, a gradient contour variance (that is, prior knowledge of a gradient contour) is used to compensate for the image, and a used method is much easier than solving of the complex Poisson's equation, thereby increasing an operational speed and saving computing resources.

DESCRIPTION OF EMBODIMENTS

For the purpose of description rather than limitation, the following provides such specific details as a specific system structure, interface, and technology to understand the present application thoroughly. However, a person skilled in the art should understand that the present application can also be implemented in other embodiments not providing such specific details. In other cases, details of a well-known apparatus, circuit, and method are omitted to avoid hindering the description of the present application by unnecessary details.

Figure 1:
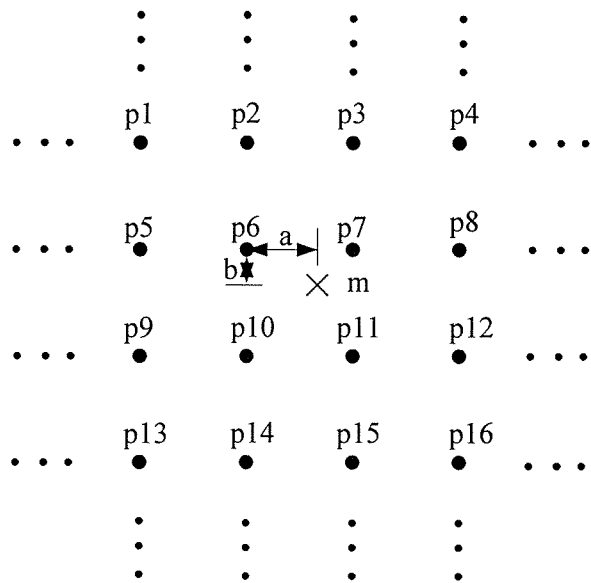
FIG. 1 is a schematic diagram of an image interpolation method according to an implementation manner in the prior art.
Figure 2:
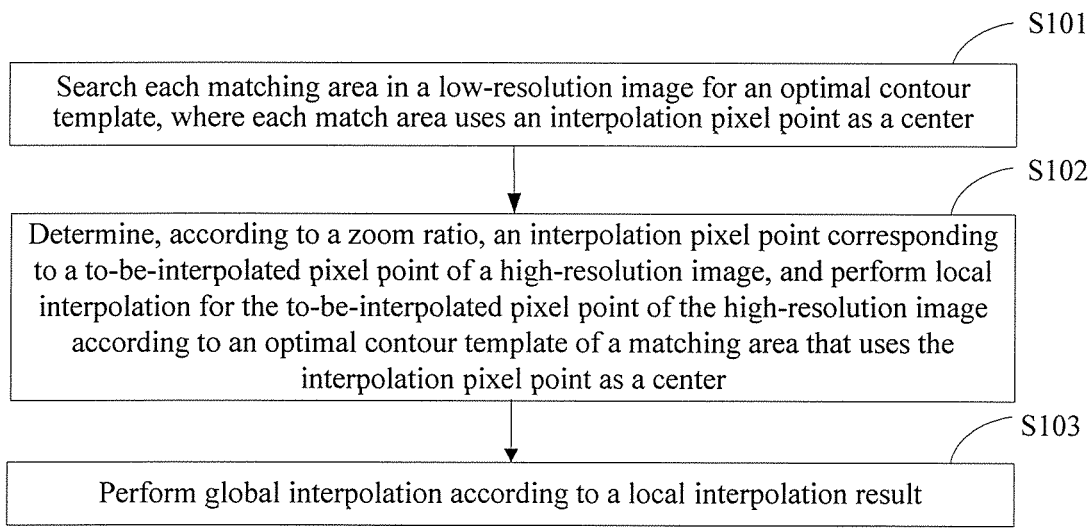
FIG. 2 is a flowchart of an image enlargement method according to an implementation manner of the present application.

As shown in FIG. 2, FIG. 2 is a flowchart of an image enlargement method according to an implementation manner of the present application. The image enlargement method in this implementation manner includes:

S101: Search each matching area in a low-resolution image for an optimal contour template, where each match area uses an interpolation pixel point as a center.

First, a low-resolution image is input.

Figure 3:
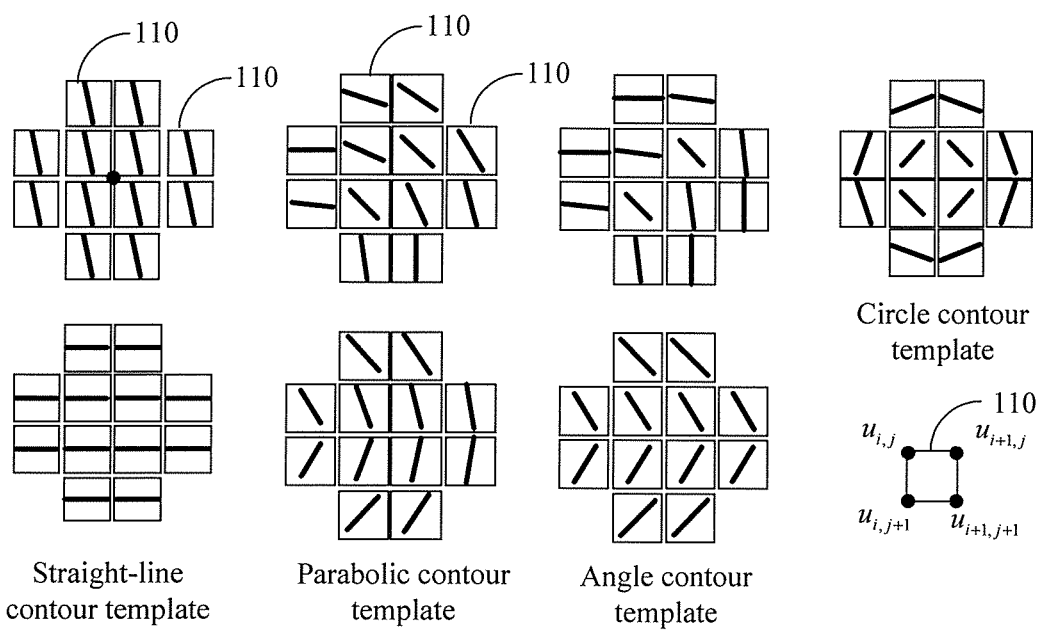
FIG. 3 is a schematic diagram of each contour template in a contour template set in an image enlargement method according to the present application.

As shown in FIG. 3, a contour template set includes a straight-line contour template, a parabolic contour template, an angle contour template, a circle contour template, and the like. Each contour template includes 12 units 110, and each unit 110 is corresponding to four pixel points of the low-resolution image, that is a pixel point $u_{i,j}$, a pixel point $u_{i+1,j}$, a pixel point $u_{i,j+1}$, and a pixel point $u_{i+1,j+1}$. Generally, an edge of the low-resolution image can always be matched with the straight-line contour template, the parabolic contour template, the angle contour template, and the circle contour template. For example, the low-resolution image is a horizontally disposed rectangle on a white background; it can be understood that at four angles of the rectangle, the angle contour template can be used for matching, and on four sides of the rectangle, the straight-line contour template can be used for matching. At a location other than an edge of the low-resolution image, for example, the white background, it can be specified that the circle contour template is used for matching. When the rectangle slopes along a certain direction, an existing contour template cannot be matched with the rectangle. In this case, the existing contour template can be rotated to match the edges of the rectangle.

Then, a total variation value of each contour template in a contour template set and a matching area, which uses an interpolation pixel point as a center, of the low-resolution image is calculated, so as to find, for the matching area, a contour template with a minimum total variation value as an optimal contour template. Specifically, When a scanning direction is from left to right, first, a 5*5 pixel area in which the interpolation pixel point in the $0^{th}$ row and $0^{th}$ column of the low-resolution image is selected as a center is used as a matching area; To be better corresponding to a Gaussian function and describe an edge of the image, matching is not performed for four vertexes of the matching area. A total variation value of a contour template in the contour template set and the matching area, which uses the interpolation pixel point as the center, of the low-resolution image is calculated. During calculation, total variations of four pixel points corresponding to each unit 110 are first calculated according to the formula (1.1), and then, a total variation value of the matching area and the entire contour template is calculated by using the formula (1.2) and according to the total variations obtained through calculation by using the formula (1.1), $$TV_{i,j}(u) := \begin{cases} \frac{h}{2}\begin{pmatrix} |\alpha(u_{i+1,j+1} - u_{i,j+1}) + \beta(u_{i,j+1} - u_{i,j})| + \\ |\alpha(u_{i+1,j} - u_{i,j}) + \beta(u_{i+1,j+1} - u_{i+1,j})| \end{pmatrix} & \alpha\beta \geq 0, \\ \frac{h}{2}\begin{pmatrix} |\alpha(u_{i,j+1} - u_{i+1,j+1}) + \beta(u_{i+1,j} - u_{i+1,j+1})| + \\ |\alpha(u_{i+1,j} - u_{i,j}) + \beta(u_{i,j+1} - u_{i,j})| \end{pmatrix} & \alpha\beta \leq 0 \end{cases} \quad (1.1)$$

$$TV(S, u) := \sum_{i=-N}^{N} \sum_{j=-N}^{N} S_{i,j}(x) TV_{i,j}(u) \quad (1.2)$$

where $TV_{i,j}(u)$ indicates total variations of the four pixel points, that is, the pixel point $u_{i,j}$, the pixel point $u_{i+1,j}$, the pixel point $u_{i,j+1}$, and the pixel point $u_{i+1,j+1}$, corresponding to each unit 110, i,j are a row coordinate and a column coordinate, respectively, h is a spatial discretization step size, $\alpha$ and $\beta$ are rotation factors, $\alpha=\cos\theta$, $\beta=\sin\theta$, $\theta$ is a rotation angle, $$S(x) = \frac{1}{h^2} \int_{\Omega_{i,j}} \nabla \psi^+ \, dx, x \in \Omega_{i,j},$$

$\psi=H*\phi$, H is a point spread function, $\phi$ is a contour model, $\phi$ herein may be a distance function of one contour template in the straight-line contour template, the parabolic contour template, the angle contour template, the circle contour template, and the like, $\Omega_{i,j}$ is a unit 110 formed by four adjacent pixel points, N is 2 in this implementation manner, and points of i=−2, j=−2, i=2, j=−2, i=−2, j=2, and i=2, j=2 cannot be selected.

After the formula (1.2) is used to calculate a total variation value of each contour template in the contour template set and the matching area, the formula (1.3) is used to find the optimal contour template with a minimum total variation value, $$S^*(k) = \underset{S \in \Sigma}{\arg\min} TV(S, u(k)) \quad (1.3)$$

where k is a center point of the matching area, in this case, k is the pixel point in the $0^{th}$ row and $0^{th}$ column, S*(k) is the optimal contour template of the point k, $\Sigma$ is the contour template set, and u(k) is a pixel value of the point k.

Then, the center point of the matching area is moved by using rows or columns as a unit, and the foregoing steps are repeated until an optimal contour template is found for each matching area.

S102: Determine, according to a zoom ratio, an interpolation pixel point corresponding to a to-be-interpolated pixel point of a high-resolution image, and perform local interpolation for the to-be-interpolated pixel point of the high-resolution image according to an optimal contour template of a matching area that uses the interpolation pixel point as a center, so as to obtain a local interpolation result, where the high-resolution image is an image obtained after the low-resolution image is enlarged according to the zoom ratio.

Figure 4:
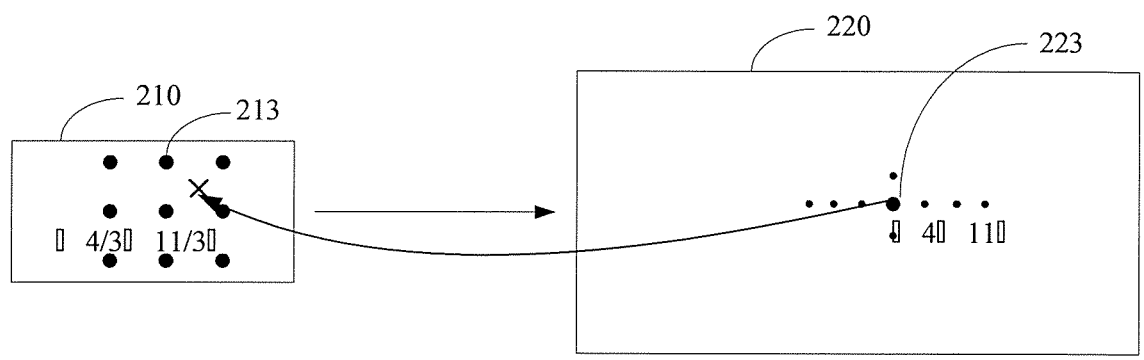
FIG. 4 is a schematic diagram of calculating an interpolation pixel point according to a to-be-interpolated pixel point in an image enlargement method according to the present application.

As shown in FIG. 4, a low-resolution image 210 includes a plurality of interpolation pixel points 213, each interpolation pixel point 213 has a pixel value, the plurality of interpolation pixel points 213 are combined together, and the interpolation pixel points 213 have different pixel values, so that the low-resolution image 210 can present a picture. A high-resolution image 220 is an image obtained after the low-resolution image 210 is enlarged. The high-resolution image 220 also includes a plurality of to-be-interpolated pixel points, and pixel values of the to-be-interpolated pixel points in the high-resolution image 220 can be obtained according to the pixel values of the interpolation pixel points 213 of the low-resolution image 210 and through interpolation by using an interpolation algorithm. These pixel points whose pixel values need to be obtained through interpolation operations are called the to-be-interpolated pixel points 223.

For the purpose of ensuring a similarity between the low-resolution image 210 and the high-resolution image 220, locations of interpolation points that are in the low-resolution image 210 and are corresponding to the to-be-interpolated pixel points 223 in the high-resolution image 220 can be calculated according to the zoom ratio. Generally, the locations of the interpolation points in the low-resolution image 210 can be obtained by dividing locations of the to-be-interpolated pixel points in the high-resolution image 220 by the zoom ratio. For example, if the zoom ratio is 3, and when a location of a to-be-interpolated pixel point in the high-resolution image 220 is (4, 11), the location of the to-be-interpolated pixel point is divided by 3, and a location of an interpolation point in the low-resolution image 210 is (4/3, 11/3).

An oriented function of an interpolation of the interpolation pixel point is calculated according to the optimal contour template of the matching area that uses the interpolation pixel point as the center. Specifically, a direction angle function $\theta_S^n$ and an anisotropy function $u_S$ of the interpolation pixel point are calculated according to the formula (2.1) and the optimal contour template, where the oriented function $\rho_{S^*(k)}^n$ indicated by the direction angle function $\theta_S^n$ and the anisotropy function $u_S$, $$\theta_S^n = L \int \nabla \varphi_S^\perp (k-n) dx \quad (2.1)$$

$$u_S = \min_{n \in N} \left| \int \nabla \varphi_S (k-n) dx \right|$$

where $\phi_S$ is a distance function of the optimal contour template of the matching area that uses the interpolation pixel point as the center, $\nabla \phi_S^\perp$ indicates that $\phi_S$ is projected to a first axis and a second axis that are perpendicular to each other and then gradients are separately calculated in the directions of the first axis and the second axis that are perpendicular to each other, k is the interpolation pixel point, N indicates a pixel point set in a neighbor area of the pixel point k, and n is a pixel point in the pixel point set.

Then, the local interpolation is further performed for the to-be-interpolated pixel point of the high-resolution image according to the oriented function of the interpolation of the interpolation pixel point. Specifically, the local interpolation is performed for the to-be-interpolated pixel point of the high-resolution image according to $$u_k(x) = v_k + \sum_{n \in N} c_n \rho_{S^*(k)}^n (x-n),$$

where x is the to-be-interpolated pixel point, k is the interpolation pixel point, $u_k(x)$ is a local interpolation of the to-be-interpolated pixel point, $v_k$ is a pixel value of the interpolation pixel point, N is a pixel point set in a neighbor area of X, n is a pixel point in the pixel point set, $c_n$ is an interpolation coefficient, and $\rho_{S^*(k)}^n$ is an oriented function of the interpolation pixel point when an optimal contour template S*( ) is used.

Selection of the interpolation coefficient $c_n$ should meet a discretization model of point spread function, that is, the interpolation coefficient $c_n$ should meet the formula (2.2), $$\sum_n (A_{S^*}(k))_{m,n} c_n = v_{k+m} - v_k, n \in N \quad (2.2)$$

where k is the interpolation pixel point, N is a neighbor area that uses k as the center, m is a point in the neighbor area N, n is a point in a neighbor area N that uses m as the center, v is the low-resolution image, each element in a matrix $A_{S^*}$ meets $(A_{S^*})_{m,n} = (h^* \rho_{S^*}^n)(m-n)$, h is a point spread function, and $\rho_{S^*}^n$ is an oriented function obtained through calculation when the optimal contour template is used.

After the foregoing steps, a local interpolation result of each to-be-interpolated pixel point can be obtained.

S103: Perform global interpolation according to the local interpolation result, so as to obtain the high-resolution image. For a to-be-interpolated pixel point in the high-resolution image, the global interpolation can be performed according to the formula $$u(x) = \sum_{k \in \square^2} w(x-k) u_k(x-k),$$

where x is the to-be-interpolated pixel point, u(x) is a global interpolation result of the to-be-interpolated pixel point, k is a pixel point in a neighbor area $\square^2$ of the pixel point x, w(x−k) is a weight value of a pixel point x−k, and $u_k(x-k)$ is a local interpolation result of the pixel point x−k.

After interpolation performed for all to-be-interpolated pixel points in the high-resolution image is complete, the high-resolution image can be obtained.

In the present application, each matching area is searched for an optimal contour template, and interpolation and enlargement are performed according to the optimal contour template. The optimal contour template includes prior knowledge of a contour in an image, and therefore the optimal contour template is used to perform the interpolation, so that occurrences of phenomena such as blur, spreading, and ringing artifact on an edge of a high-resolution image obtained after the interpolation are significantly reduced, and definition of the image after the enlargement is improved.

Figure 5:
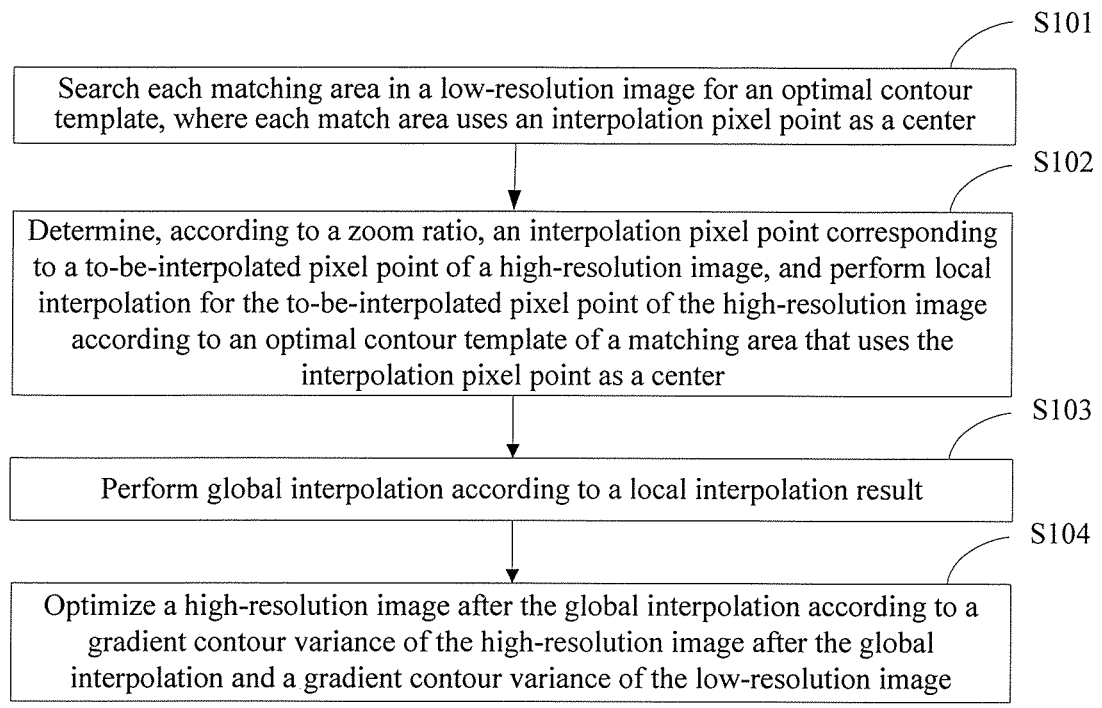
FIG. 5 is a flowchart of an image enlargement method according to another implementation manner of the present application.

As shown in FIG. 5, FIG. 5 is a flowchart of an image enlargement method according to another implementation manner of the present application. The image enlargement method in this implementation manner further has step S104 besides using all steps in the embodiment shown in FIG. 2.

S104: Optimize the high-resolution image after the global interpolation according to a gradient contour variance of the high-resolution image after the global interpolation and a gradient contour variance of the low-resolution image, so as to obtain an optimized high-resolution image.

Specifically, four steps may be included:

(1) Obtain a change rate according to the gradient contour variance of the high-resolution image after the global interpolation and the gradient contour variance of the low-resolution image.

A gradient of an image can be indicated by $\nabla I = m \cdot \vec{N}$, where I is a corresponding image, $\vec{N}$ is a gradient direction, and m is a gradient modulus, that is, $$m = \sqrt{\left(\frac{\partial I}{\partial x}\right)^2 + \left(\frac{\partial I}{\partial y}\right)^2}.$$

Specifically, during image processing, the Sobel operator can be used to calculate a gradient of an image, and a location where a gradient modulus is not zero is an edge of the image. A Sobel operator template is:

$$dx = \begin{bmatrix} -1 & 0 & 1 \\ -2 & 0 & 2 \\ -1 & 0 & 1 \end{bmatrix}, dy = \begin{bmatrix} 1 & 2 & 1 \\ 0 & 0 & 0 \\ -1 & -2 & -1 \end{bmatrix}.$$

Figure 6:
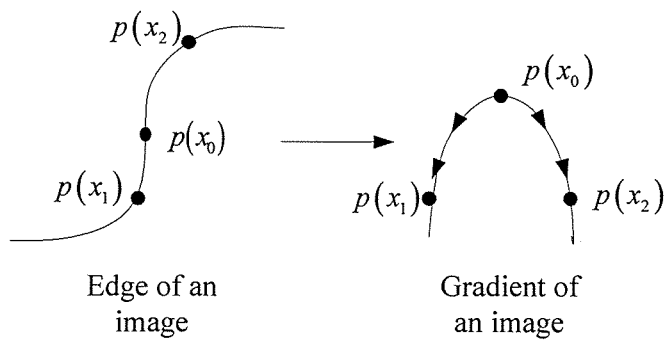
FIG. 6 is a schematic diagram of a gradient of an edge of an image in an image enlargement method according to the present application.

However, as shown in FIG. 6, pixel values of an edge of an image change gradually, and a change trend is changing gently first (for example, adjacent to $p(x_1)$), then changing sharply (for example, adjacent to $p(x_0)$), and then changing gently (for example, adjacent to $p(x_2)$), which is represented as an opening-down parabola when reflected in a gradient modulus. Generally, during the image processing, it is expected that a sharpening degree of the edge of the image is relatively high. However, phenomena such as spreading and blur still exist on an edge of the high-resolution image after the interpolation. Because an edge contour of the low-resolution image is consistent with an edge contour of the high-resolution image, it may be considered that a pixel point on an edge of the low-resolution image is used to restrain a pixel point on the edge of the high-resolution image, so that the edge of the high-resolution image becomes more sharpening. In mathematics, the change rate between the gradient contour variance of the high-resolution image and the gradient contour variance of the low-resolution image can be used for retraining. To obtain, through calculation, a gradient contour variance, a pixel point with the maximum local gradient modulus $p(x_0)$ must be obtained through calculation first.

A definition of the gradient contour variance $\sigma(p_{x_0})$ is:

$$\sigma(p_{x_0}) = \sqrt{\sum_{x \in Z} \frac{m(x)}{M(x_0)} d^2(x, x_0)}$$

where $p(x_0)$ is the maximum local gradient modulus, Z is a coordinate set of a pixel point, whose gradients are not zero, in a neighbor area of $x_0$, x is a coordinate of a pixel point in Z, m(x) is a gradient modulus of x, $$M(x_0) = \sum_{x \in Z} m(x),$$

and $d(x,x_0)$ indicates a length of a curve along a gradient contour between pixel points x and $x_0$.

Therefore, once the maximum local gradient modulus $p(x_0)$ is obtained, the gradient contour variance $\sigma_H$ of the high-resolution image after the interpolation and the gradient contour variance $\sigma_L$ of the low-resolution image can be obtained through calculation according to the definition of the gradient contour variance, and the change rate can be obtained according to $$r(d) = \frac{\sigma_H}{\sigma_L},$$

where r(d) is the change rate, $\sigma_H$ is the gradient contour variance of the high-resolution image after the global interpolation, and $\sigma_L$ is the gradient contour variance of the low-resolution image.

(2) Obtain, through calculation, a target gradient field according to an original gradient field of the high-resolution image after the interpolation and the change rate.

After the change rate is obtained, the target gradient field can be obtained through calculation according to $\nabla I_t^T = r(d) \cdot \nabla I_s$, where $\nabla I_t^T$ is the target gradient field, r(d) is the change rate, and $\nabla I_s$ is the original gradient field of the high-resolution image after the interpolation. The change rate is introduced in the formula, and actually the gradient contour variance of the low-resolution image is also introduced in the formula. The target gradient field of the high-resolution image is re-obtained, so that the edge of the high-resolution image becomes more sharpening.

(3) Reconstruct the high-resolution image after the global interpolation according to the target gradient field, so as to obtain an initial reconstructed high-resolution image.

After the target gradient field of the high-resolution image is obtained, the high-resolution image after the global $$I_H^{t_0} = w \cdot \frac{dx + dy}{2} + I_H,$$

interpolation can be reconstructed according to where $I_H^{t_0}$ is the initial reconstructed high-resolution image, w is weight, which can be set manually according to experience, dx and dy are direction gradients of $\nabla I_t^T$ on a first axis and a second axis, respectively, and $I_H$ is the high-resolution image after the global interpolation. The high-resolution image after the reconstruction has a more sharpened edge and a better visual effect.

(4) Compensate for a high-resolution image before iteration according to a difference between a downsampling image of the high-resolution image before the iteration and the low-resolution image, so as to obtain a high-resolution image after the iteration, and after many times of iteration, obtain the optimized high-resolution image, where an initial image of the high-resolution image before the iteration is the initial reconstructed high-resolution image.

To further obtain an even better image effect, the high-resolution image before the iteration can be compensated for according to the formula $I_H^{t+1} = I_H^t + \tau \cdot ((I_H^t * G)\downarrow - I_l)\uparrow * G$, where $I_H^{t+1}$ is the high-resolution image after the iteration, $I_H^t$ is the high-resolution image before the iteration, an initial value of $I_H^t$ is $I_H^{t_0}$, $\tau$ is an iteration step size, G is the Gaussian kernel, $I_l$ is the low-resolution image, $\downarrow$ is downsampling, and $\uparrow$ is upsampling.

That is, after the initial reconstructed high-resolution image is obtained, downsampling is performed for the initial reconstructed high-resolution image first, so that the initial reconstructed high-resolution image becomes an image that has a same size as the low-resolution image, and then the low-resolution image is subtracted, thereby obtaining a difference image. Then, upsampling is performed for the difference image to obtain a difference image that has a same size as the high-resolution image, and the difference image after the upsampling is added to the initial reconstructed high-resolution image, thereby reducing a difference between the high-resolution image and the low-resolution image.

Certainly, to continue to reduce the difference between the high-resolution image and the low-resolution image, the processes of downsampling, subtraction to obtain a difference image, upsampling, and addition can be performed for the high-resolution image after the addition. The number of times of iteration can be determined according to experience. Generally, three times of iteration are used herein, and a satisfied effect can be obtained.

In this implementation manner, a gradient contour variance (that is, prior knowledge of a gradient contour) is used to compensate for an image, and a used method is much easier than solving of the complex Poisson's equation, thereby increasing an operational speed and saving computing resources.

Figure 7:
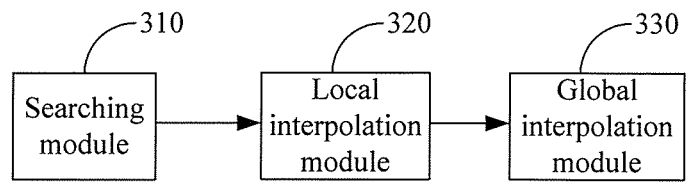
FIG. 7 is a schematic structural diagram of an image enlargement apparatus according to an implementation manner of the present application.

As shown in FIG. 7, FIG. 7 is a schematic structural diagram of an image enlargement apparatus according to an implementation manner of the present application. The image enlargement apparatus in this implementation manner includes a searching module 310, a local interpolation module 320, and a global interpolation module 330.

The searching module 310 is configured to search each matching area in a low-resolution image for an optimal contour template, where each matching area uses an interpolation pixel point as a center.

For example, first, a low-resolution image is input. As shown in FIG. 3, a contour template set includes a straight-line contour template, a parabolic contour template, an angle contour template, a circle contour template, and the like. Each contour template includes 12 units 110, and each unit 110 is corresponding to four pixel points of the low-resolution image, that is a pixel point $u_{i,j}$, a pixel point, a pixel point $u_{i,j+1}$, and a pixel point $u_{i+1,j+1}$. Generally, an edge of the low-resolution image can always be matched with the straight-line contour template, the parabolic contour template, the angle contour template, and the circle contour template. For example, the low-resolution image is a horizontally disposed rectangle on a white background; it can be understood that at four angles of the rectangle, the angle contour template can be used for matching, and on four sides of the rectangle, the straight-line contour template can be used for matching. At a location other than an edge of the low-resolution image, for example, the white background, it can be specified that the circle contour template is used for matching. When the rectangle slopes along a certain direction, an existing contour template cannot be matched with the rectangle. In this case, the existing contour template can be rotated to match the edges of the rectangle.

Then, the searching module 310 calculates a total variation value of each contour template in a contour template set and a matching area, which uses an interpolation pixel point as a center, of the low-resolution image, so as to find, for the matching area, a contour template with a minimum total variation value as an optimal contour template. Specifically, When a scanning direction is from left to right, first, a 5*5 pixel area in which the interpolation pixel point in the 0th row and 0th column of the low-resolution image is selected as a center is used as a matching area; To be better corresponding to a Gaussian function and describe an edge of the image, matching is not performed for four vertexes of the matching area. A total variation value of a contour template in the contour template set and the matching area, which uses the interpolation pixel point as the center, of the low-resolution image is calculated. During calculation, total variations of four pixel points corresponding to each unit 110 are first calculated according to the formula (1.1), and then, a total variation value of the matching area and the entire contour template is calculated by using the formula (1.2) and according to the total variations obtained through calculation by using the formula (1.1), $$TV_{i,j}(u) := \begin{cases} \frac{h}{2}(|\alpha(u_{i+1,j+1} - u_{i,j+1}) + \beta(u_{i,j+1} - u_{i,j})| + \\ |\alpha(u_{i+1,j} - u_{i,j}) + \beta(u_{i+1,j+1} - u_{i+1,j})|) \; \alpha\beta \geq 0, \\ \frac{h}{2}(|\alpha(u_{i,j+1} - u_{i+1,j+1}) + \beta(u_{i+1,j} - u_{i+1,j+1})| + \\ |\alpha(u_{i+1,j} - u_{i,j}) + \beta(u_{i,j+1} - u_{i,j})|) \; \alpha\beta \leq 0. \end{cases} \quad (1.1)$$

$$TV(S, u) := \sum_{i=-N}^{N} \sum_{j=-N}^{N} S_{i,j}(x) TV_{i,j}(u) \quad (1.2)$$

where $TV_{i,j}(u)$ indicates total variations of the four pixel points, that is, the pixel point $u_{i,j}$, the pixel point $u_{i+1,j}$, the pixel point $u_{i,j+1}$, and the pixel point $u_{i+1,j+1}$, corresponding to each unit 110, i,j are a row coordinate and a column coordinate, respectively, h is a spatial discretization step size, $\alpha$ and $\beta$ are rotation factors, $\alpha=\cos\theta$, $\beta=\sin\theta$, $\theta$ is a rotation angle, $$S(x) = \frac{1}{h^2} \int_{\Omega_{i,j}} \nabla \psi^\perp \, dx, x \in \Omega_{i,j},$$

$\psi = H*\phi$, H is a point spread function, $\phi$ is a contour model, $\phi$ herein may be a distance function of one contour template in the straight-line contour template, the parabolic contour template, the angle contour template, the circle contour template, and the like, $\Omega_{ij}$ is a unit 110 formed by four adjacent pixel points, N is 2 in this implementation manner, and points of i=−2, j=−2, i=2, j=−2 i=−2, j=2 and i=2, j=2 cannot be selected.

After the formula (1.2) is used to calculate a total variation value of each contour template in the contour template set and the matching area, the formula (1.3) is used to find the optimal contour template with a minimum total variation value, $$S^*(k) = \underset{S \in \Sigma}{\operatorname{argmin}} TV(S, u(k)) \quad (1.3)$$

where k is a center point of the matching area, in this case, k is the pixel point in the $0^{th}$ row and $0^{th}$ column, $S^*(k)$ is the optimal contour template of the point k, is the contour template set, and u(k) is a pixel value of the point k.

Then, the center point of the matching area is moved by using rows or columns as a unit, and the foregoing steps are repeated until an optimal contour template is found for each matching area.

The searching module 310 sends the optimal contour template to the local interpolation module 320.

The local interpolation module 320 is configured to receive the optimal contour template, determine, according to a zoom ratio, an interpolation pixel point corresponding to a to-be-interpolated pixel point of a high-resolution image, and perform local interpolation for the to-be-interpolated pixel point of the high-resolution image according to an optimal contour template of a matching area that uses the interpolation pixel point as a center, so as to obtain a local interpolation result, where the high-resolution image is an image obtained after the low-resolution image is enlarged according to the zoom ratio.

For example, as shown in FIG. 4, a low-resolution image 210 includes a plurality of interpolation pixel points 213, each interpolation pixel point 213 has a pixel value, the plurality of interpolation pixel points 213 are combined together, and the interpolation pixel points 213 have different pixel values, so that the low-resolution image 210 can present a picture. A high-resolution image 220 is an image obtained after the low-resolution image 210 is enlarged. The high-resolution image 220 also includes a plurality of to-be-interpolated pixel points, and pixel values of the to-be-interpolated pixel points in the high-resolution image 220 can be obtained according to the pixel values of the interpolation pixel points 213 of the low-resolution image 210 and through interpolation by using an interpolation algorithm. These pixel points whose pixel values need to be obtained through interpolation operations are called the to-be-interpolated pixel points 223.

To ensure a similarity between the low-resolution image 210 and the high-resolution image 220, the local interpolation module 320 can calculate, according to the zoom ratio, locations of interpolation points that are in the low-resolution image 210 and are corresponding to the to-be-interpolated pixel points 223 in the high-resolution image 220. Generally, the locations of the interpolation points in the low-resolution image 210 can be obtained by dividing locations of the to-be-interpolated pixel points in the high-resolution image 220 by the zoom ratio. For example, if the zoom ratio is 3, and when a location of a to-be-interpolated pixel point in the high-resolution image 220 is (4, 11), the location of the to-be-interpolated pixel point is divided by 3, and a location of an interpolation point in the low-resolution image 210 is (4/3, 11/3).

The local interpolation module 320 calculates an oriented function of an interpolation of the interpolation pixel point according to the optimal contour template of the matching area that uses the interpolation pixel point as the center. Specifically, a direction angle function $\theta_S^n$ and an anisotropy function $u_S$ of the interpolation pixel point are calculated according to the formula (2.1) and the optimal contour template, where the oriented function $\rho_{s^*(k)}^n$ is indicated by the direction angle function $\theta_S^n$ and the anisotropy function $u_S$, $$\theta_S^n = \angle \int \nabla \varphi_S^{\perp}(k-n)dx \qquad (2.1)$$
$$u_S = \min_{n \in N} \left| \int \nabla \varphi_S(k-n)dx \right|$$

where $\phi_S$ is a distance function of the optimal contour template of the matching area that uses the interpolation pixel point as the center, $\nabla \phi_S^{\perp}$ indicates that $\phi_S$ is projected to a first axis and a second axis that are perpendicular to each other and then gradients are separately calculated in the directions of the first axis and the second axis that are perpendicular to each other, k is the interpolation pixel point, N indicates a pixel point set in a neighbor area of the pixel point k, and n is a pixel point in the pixel point set.

Then, the local interpolation module 320 further performs the local interpolation for the to-be-interpolated pixel point of the high-resolution image according to the oriented function of the interpolation of the interpolation pixel point. Specifically, the local interpolation module 320 performs the local interpolation for the to-be-interpolated pixel point of the high-resolution image according to $$u_k(x) = v_k + \sum_{n \in N} c_n \rho_{s^*(k)}^n (x-n),$$

where x is the to-be-interpolated pixel point, k is the interpolation pixel point, $u_k(x)$ is a local interpolation of the to-be-interpolated pixel point, $v_k$ is a pixel value of the interpolation pixel point, N is a pixel point set in a neighbor area of x, n is a pixel point in the pixel point set, $C_n$ is an interpolation coefficient, and $\rho_{s^*(k)}^n$ is an oriented function of the interpolation pixel point when an optimal contour template S*( ) is used.

Selection of the interpolation coefficient $c_n$ should meet a discretization model of point spread function, that is, the interpolation coefficient $c_n$ should meet the formula (2.2), $$\sum_n (A_{S^*}(k))_{m,n} c_n = v_{k+m} - v_k, n \in N \qquad (2.2)$$

where k is the interpolation pixel point, N is a neighbor area that uses k as the center, m is a point in the neighbor area N, n is a point in a neighbor area N m that uses m as the center, v is the low-resolution image, each element in a matrix $A_{S^*}$ meets $(A_{S^*})_{m,n} = (h^* \rho_{S^*}^n)(m-n)$, h is a point spread function, and $\rho_{S^*}^n$ is an oriented function obtained through calculation when the optimal contour template is used.

After the local interpolation module 320 performs local interpolation for each to-be-interpolated pixel point, a local interpolation result of each to-be-interpolated pixel point can be obtained.

The local interpolation module 320 sends the local interpolation result to the global interpolation module 330.

The global interpolation module 330 is configured to receive the local interpolation result and perform global interpolation according to the local interpolation result, so as to obtain the high-resolution image.

For example, for a to-be-interpolated pixel point in the high-resolution image, the global interpolation module 330 performs the global interpolation according to the formula $$u(x) = \sum_{k \in \square^2} w(x-k) u_k (x-k),$$

where x is the to-be-interpolated pixel point, u(x) is a global interpolation result of the to-be-interpolated pixel point, k is a pixel point in a neighbor area $\square^2$ of the pixel point x, w(x−k) is a weight value of a pixel point x−k, and $u_k(x-k)$ is a local interpolation result of the pixel point x−k.

After interpolation performed by the global interpolation module 330 for all to-be-interpolated pixel points in the high-resolution image is complete, the high-resolution image can be obtained.

In the present application, each matching area is searched for an optimal contour template, and interpolation and enlargement are performed according to the optimal contour template. The optimal contour template includes prior knowledge of a contour in an image, and therefore the optimal contour template is used to perform the interpolation, so that occurrences of phenomena such as blur, spreading, and ringing artifact on an edge of a high-resolution image obtained after the interpolation are significantly reduced, and definition of the image after the enlargement is improved.

Figure 8:
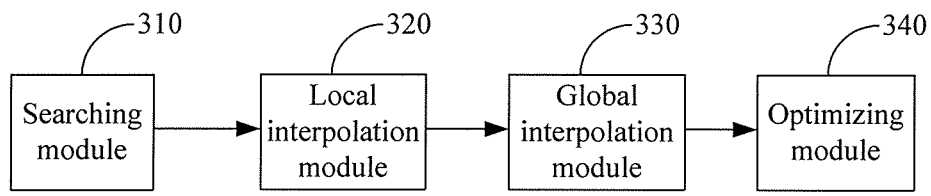
FIG. 8 is a schematic structural diagram of an image enlargement apparatus according to another implementation manner of the present application.

As shown in FIG. 8, FIG. 8 is a schematic structural diagram of an image enlargement apparatus according to another implementation manner of the present application. In this implementation manner, the image enlargement apparatus further includes an optimizing module 340, besides including the searching module 310, the local interpolation module 320, and the global interpolation module 330 shown in FIG. 7.

The optimizing module 340 is configured to optimize a high-resolution image after global interpolation according to a gradient contour variance of the high-resolution image after the global interpolation and a gradient contour variance of a low-resolution image, so as to obtain an optimized high-resolution image.

Specifically, (1) The optimizing module 340 is configured to obtain a change rate according to the gradient contour variance of the high-resolution image after the global interpolation and the gradient contour variance of the low-resolution image.

A gradient of an image can be indicated by $\nabla I = m \cdot \vec{N}$, where I is a corresponding image, $\vec{N}$ is a gradient direction, and m is a gradient modulus, that is, $$m = \sqrt{\left(\frac{\partial I}{\partial x}\right)^2 + \left(\frac{\partial I}{\partial y}\right)^2}.$$

Specifically, during image processing, the Sobel operator can be used to calculate a gradient of an image, and a location where a gradient modulus is not zero is an edge of the image. A Sobel operator template is:

$$dx = \begin{bmatrix} -1 & 0 & 1 \\ -2 & 0 & 2 \\ -1 & 0 & 1 \end{bmatrix}, dy = \begin{bmatrix} 1 & 2 & 1 \\ 0 & 0 & 0 \\ -1 & -2 & -1 \end{bmatrix}.$$

However, as shown in FIG. 6, pixel values of an edge of an image change gradually, and a change trend is changing gently first (for example, adjacent to $p(x_1)$), then changing sharply (for example, adjacent to $p(x_0)$), and then changing gently (for example, adjacent to $p(x_2)$), which is represented as an opening-down parabola when reflected in a gradient modulus. Generally, during the image processing, it is expected that a sharpening degree of the edge of the image is relatively high. Furthermore, a low-resolution image is relatively small, whereas a high-resolution image is relatively large, so that phenomena such as spreading and blur still exist on an edge of the high-resolution image after interpolation. Because an edge contour of the low-resolution image is consistent with an edge contour of the high-resolution image, it may be considered that a pixel point on an edge of the low-resolution image is used to restrain a pixel point on the edge of the high-resolution image, so that the edge of the high-resolution image becomes more sharpening. In mathematics, the change rate between the gradient contour variance of the high-resolution image and the gradient contour variance of the low-resolution image can be used for retraining. To obtain, through calculation, a gradient contour variance, a pixel point with the maximum local gradient modulus $p(x_0)$ must be obtained through calculation first.

A definition of the gradient contour variance $\sigma(p_{x_0})$ is:

$$\sigma(p_{x_0}) = \sqrt{\sum_{x \in Z} \frac{m(x)}{M(x_0)} d^2(x, x_0)}$$

where $p(x_0)$ is the maximum local gradient modulus, Z is a coordinate set of a pixel point, whose gradients are not zero, in a neighbor area of $x_0$, x is a coordinate of a pixel point in Z, m(x) is a gradient modulus of x, $$M(x_0) = \sum_{x \in Z} m(x),$$

and $d(x, x_0)$ indicates a length of a curve along a gradient contour between pixel points x and $x_0$.

Therefore, once the maximum local gradient modulus $p(x_0)$ is obtained, the optimizing module 340 can obtain, through calculation, the gradient contour variance $\sigma_H$ of the high-resolution image after the interpolation and the gradient contour variance $\sigma_L$ of the low-resolution image according to the definition of the gradient contour variance, and the change rate can be obtained according to $$r(d) = \frac{\sigma_H}{\sigma_L},$$

where r(d) is the change rate, $\sigma_H$ is the gradient contour variance of the high-resolution image after the global interpolation, and $\sigma_L$ is the gradient contour variance of the low-resolution image.

(2) The optimizing module 340 is configured to obtain, through calculation, a target gradient field according to an original gradient field of the high-resolution image after the interpolation and the change rate.

After the change rate is obtained, the optimizing module 340 can obtain, through calculation, the target gradient field according to $\nabla I_t^T = r(d) \cdot \nabla I_s$, where $\nabla I_t^T$ is the target gradient field, r(d) is the change rate, and $\nabla I_s$ is the original gradient field of the high-resolution image after the interpolation. The change rate is introduced in the formula, and actually the gradient contour variance of the low-resolution image is also introduced in the formula. The target gradient field of the high-resolution image is re-obtained, so that the edge of the high-resolution image becomes more sharpening.

(3) The optimizing module 340 reconstructs the high-resolution image after the global interpolation according to the target gradient field, so as to obtain an initial reconstructed high-resolution image.

After the target gradient field of the high-resolution image is obtained, the optimizing module 340 can reconstruct the high-resolution image after the global interpolation according to $$I_H^{t_0} = w \cdot \frac{dx+dy}{2} + I_H,$$

where $I_H^{t_0}$ is the initial reconstructed high-resolution image, w is weight, which can be set manually according to experience, dx and dy are direction gradients of $\nabla I_t^T$ on a first axis and a second axis, respectively, and $I_H$ is the high-resolution image after the global interpolation. The high-resolution image after the reconstruction has a more sharpened edge and a better visual effect.

(4) The optimizing module 340 compensates for a high-resolution image before iteration according to a difference between a downsampling image of the high-resolution image before the iteration and the low-resolution image, so as to obtain a high-resolution image after the iteration, and after many times of iteration, obtains the optimized high-resolution image, where an initial image of the high-resolution image before the iteration is the initial reconstructed high-resolution image.

To further obtain an even better image effect, the optimizing module 340 can compensate for the high-resolution image before the iteration according to the formula $I_H^{t+1} = I_H^t + \tau \cdot ((I_H^t * G) \downarrow - I_l) \uparrow * G$, where $I_H^{t+1}$ is the high-resolution image after the iteration, $I_H^t$ is the high-resolution image before the iteration, an initial value of $I_H^t$ is $I_H^{t_0}$, $\tau$ is an iteration step size, G is the Gaussian kernel, $I_l$ is the low-resolution image, $\downarrow$ is downsampling, and $\uparrow$ is upsampling.

That is, after the initial reconstructed high-resolution image is obtained, downsampling is performed for the initial reconstructed high-resolution image first, so that the initial reconstructed high-resolution image becomes an image that has a same size as the low-resolution image, and then the low-resolution image is subtracted, thereby obtaining a difference image. Then, upsampling is performed for the difference image to obtain a difference image that has a same size as the high-resolution image, and the difference image after the upsampling is added to the initial reconstructed high-resolution image, thereby reducing a difference between the high-resolution image and the low-resolution image.

Certainly, to continue to reduce the difference between the high-resolution image and the low-resolution image, the processes of downsampling, subtraction to obtain a difference image, upsampling, and addition can be performed for the high-resolution image after the addition. The number of times of iteration can be determined according to experience. Generally, three times of iteration are used herein, and a satisfied effect can be obtained.

In this implementation manner, a gradient contour variance (that is, prior knowledge of a gradient contour) is used to compensate for an image, and a used method is much easier than solving of the complex Poisson's equation, thereby increasing an operational speed and saving computing resources.

Figure 9:
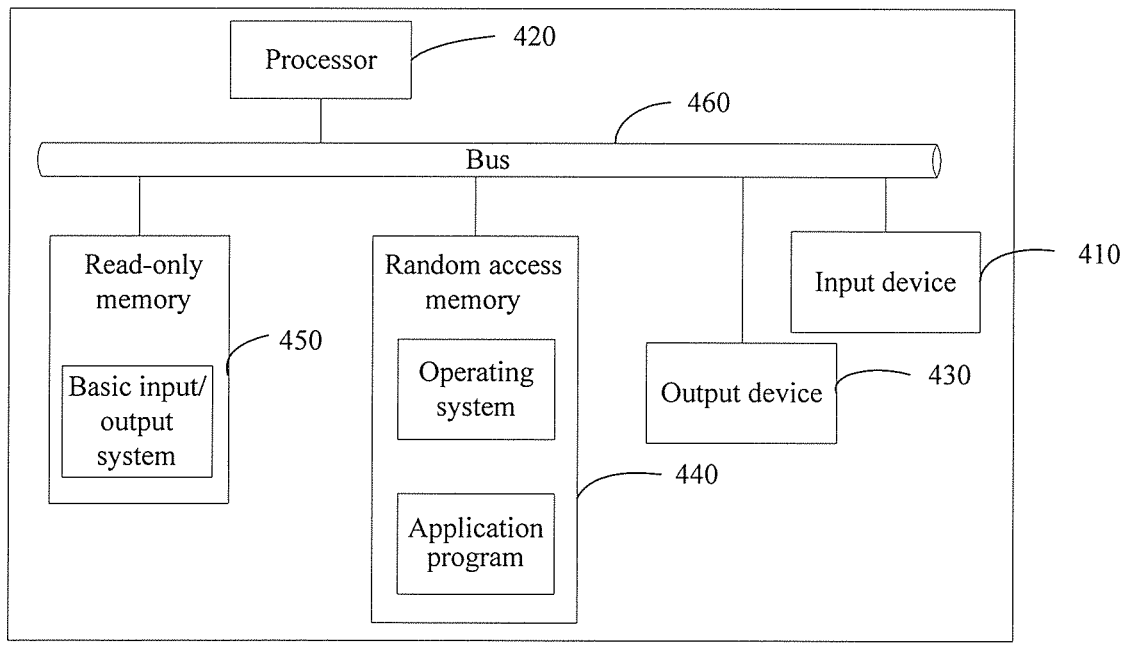
FIG. 9 is a schematic structural diagram of an image enlargement apparatus according to still another implementation manner of the present application.

As shown in FIG. 9, FIG. 9 is a schematic structural diagram of an image enlargement apparatus according to still another implementation manner of the present application. The image enlargement apparatus in this implementation manner includes an input device 410, a processor 420, an output device 430, a random access memory 440, a read-only memory 450, and a bus 460, where the processor 420 is separately coupled to the input device 410, the output device 430, the random access memory 440, and the read-only memory 450 by using the bus 460. When it is required to run the image enlargement apparatus, a basic input/output system fixed in the read-only memory 450 is used to provide guidance for a system to start, so as to provide guidance for the image enlargement apparatus to enter a normal running state. After the image enlargement apparatus enters the normal running state, an application program and an operating system are running in the random access memory 440, so that:

the processor 420 searches each matching area in a low-resolution image for an optimal contour template, where each matching area uses an interpolation pixel point as a center; determines, according to a zoom ratio, an interpolation pixel point corresponding to a to-be-interpolated pixel point of a high-resolution image, and performs local interpolation for the to-be-interpolated pixel point of the high-resolution image according to an optimal contour template of a matching area that uses the interpolation pixel point as a center, so as to obtain a local interpolation result, where the high-resolution image is an image obtained after the low-resolution image is enlarged according to the zoom ratio; and performs global interpolation according to the local interpolation result, so as to obtain the high-resolution image.

Optionally, the processor 420 is configured to: input a low-resolution image; calculate a total variation value of each contour template in a contour template set and a matching area, which uses an interpolation pixel point as a center, of the low-resolution image, so as to find, for the matching area, a contour template with a minimum total variation value as an optimal contour template; and move the matching area by using rows or columns as a unit, and repeat the foregoing steps until an optimal contour template is found for each matching area.

Optionally, the processor 420 is configured to: calculate an oriented function of an interpolation of the interpolation pixel point according to the optimal contour template of the matching area that uses the interpolation pixel point as the center; and perform the local interpolation for the to-be-interpolated pixel point of the high-resolution image according to the oriented function of the interpolation of the interpolation pixel point.

Optionally, the processor 420 is configured to calculate a direction angle function $\theta_S^n$ and an anisotropy function $u_S$ of the interpolation pixel point according to the optimal contour template of the matching area that uses the interpolation pixel point as the center, where the oriented function $\rho_{s*(k)}^n$ is indicated by the direction angle function $\theta_S^n$ and the anisotropy function $u_S$, $$\theta_S^n = L \int \nabla \varphi_S^\perp (k-n) dx$$

$$u_S = \min_{n \in N} \left| \int \nabla \varphi_S (k-n) dx \right|$$

where $\phi_S$ is the optimal contour template, $\nabla \phi_S^\perp$ indicates that $\phi_S$ is projected to a first axis and a second axis that are perpendicular to each other and then gradients are separately calculated in the directions of the first axis and the second axis that are perpendicular to each other, k is the interpolation pixel point, N indicates a pixel point set in a neighbor area of the pixel point k, and n is a pixel point in the pixel point set.

Optionally, the processor 420 is configured to perform the local interpolation for the to-be-interpolated pixel point of the high-resolution image according to $$u_k(x) = v_k + \sum_{n \in N} c_n \rho_{s^*(k)}^n (x-n),$$

where x is the to-be-interpolated pixel point, k is the interpolation pixel point, $u_k(x)$ is a local interpolation of the to-be-interpolated pixel point, $v_k$ is a pixel value of the interpolation pixel point, N is a pixel point set in a neighbor area of x, n is a pixel point in the pixel point set, $c_n$ is an interpolation coefficient, and $\rho_{s^*(k)}^n$ is an oriented function of the interpolation pixel point when an optimal contour template S*( ) is used.

Optionally, the processor 420 is configured to perform the global interpolation according to the formula $$u(x) = \sum_{k \in \square^2} w(x-k) u_k(x-k),$$

where x is the to-be-interpolated pixel point, u(x) is a global interpolation result of the to-be-interpolated pixel point, k is a pixel point in a neighbor area $\square^2$ of the pixel point x, w(x−k) is a weight value of a pixel point x−k, and $u_k(x-k)$ is a local interpolation result of the pixel point x−k.

Optionally, the processor 420 is configured to optimize the high-resolution image after the global interpolation according to a gradient contour variance of the high-resolution image after the global interpolation and a gradient contour variance of the low-resolution image, so as to obtain an optimized high-resolution image.

Optionally, the processor 420 is configured to: obtain a change rate according to the gradient contour variance of the high-resolution image after the global interpolation and the gradient contour variance of the low-resolution image; obtain, through calculation, a target gradient field according to an original gradient field of the high-resolution image after the interpolation and the change rate; reconstruct the high-resolution image after the global interpolation according to the target gradient field, so as to obtain an initial reconstructed high-resolution image; and compensate for a high-resolution image before iteration according to a difference between a downsampling image of the high-resolution image before the iteration and the low-resolution image, so as to obtain a high-resolution image after the iteration, and after many times of iteration, obtain the optimized high-resolution image, where an initial image of the high-resolution image before the iteration is the initial reconstructed high-resolution image.

Optionally, the processor 420 is configured to obtain the change rate according to $$r(d) = \frac{\sigma_H}{\sigma_L},$$

where r(d) is the change rate, $\sigma_H$ is the gradient contour variance of the high-resolution image after the global interpolation, and $\sigma_L$ is the gradient contour variance of the low-resolution image.

Optionally, the processor 420 is configured to obtain, through calculation, the target gradient field according to $\nabla I_t^T = r(d) \cdot \nabla I_s$, where $\nabla I_t^T$ is the target gradient field, r(d) is the change rate, and $\nabla I_s$ is the original gradient field of the high-resolution image after the interpolation.

Optionally, the processor 420 is configured to reconstruct the high-resolution image after the global interpolation according $$I_H^{t_0} = w \cdot \frac{dx + dy}{2} + I_H,$$

to where $I_H^{t_0}$ is the initial reconstructed high-resolution image, w is weight, dx and dy are direction gradients of $\nabla I_t^T$ on a first axis and a second axis, respectively, and $I_H$ is the high-resolution image after the global interpolation.

Optionally, the processor 420 is configured to compensate for the high-resolution image before the iteration according to the formula $I_H^{t+1} = I_H^t + \tau \cdot ((I_H^t * G) \downarrow - I_l) \uparrow * G$, where $I_H^{t+1}$ is the high-resolution image after the iteration, $I_H^t$ is the high-resolution image before the iteration, an initial value of $I_H^t$ is $I_H^{t_0}$, $\tau$ is an iteration step size, G is the Gaussian kernel, $I_l$ is the low-resolution image, $\downarrow$ is downsampling, and $\uparrow$ is upsampling.

In the present application, each matching area is searched for an optimal contour template, and interpolation and enlargement are performed according to the optimal contour template. The optimal contour template includes prior knowledge of a contour in an image, and therefore the optimal contour template is used to perform the interpolation, so that occurrences of phenomena such as blur, spreading, and ringing artifact on an edge of a high-resolution image obtained after the interpolation are significantly reduced, and definition of the image after the enlargement is improved.

Furthermore, a gradient contour variance (that is, prior knowledge of a gradient contour) is used to compensate for the image, and a used method is much easier than solving of the complex Poisson's equation, thereby increasing an operational speed and saving computing resources.

In the several implementation manners provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the implementation manners.

In addition, functional units in the implementation manners of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor (processor) to perform all or some steps of the methods described in the implementation manners of the present application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

What is claimed is:

1. An image enlargement method, the method comprising:
   inputting a low-resolution image, wherein the low-resolution image comprises matching areas and the matching areas are used to match all contour templates in a contour template set;
   searching one matching area for an optimal contour template;
   finding a second pixel point according to a zoom ratio and a first pixel point in the matching area, wherein the second pixel point is corresponding to the first pixel point;
   performing local interpolation for the second pixel point according to the optimal contour template, so as to obtain an intermediate pixel value;
   repeating the steps of searching one matching area, finding a second pixel point, and performing local interpolation until processing for all the matching areas is complete, and obtaining an initial high-resolution image according to all of the intermediate pixel values;
   performing global interpolation for the initial high-resolution image to obtain a high-resolution image; and
   wherein performing local interpolation for the second pixel point according to the optimal contour template comprises:
      calculating an oriented function of an interpolation of the second pixel point according to an optimal contour template of a matching area of the first pixel point corresponding to the second pixel point, and
      performing the local interpolation for the second pixel point according to the oriented function of the interpolation of the second pixel point.

2. The method according to claim 1, wherein the step of calculating an oriented function of an interpolation of the second pixel point according to an optimal contour template of a matching area of the first pixel point corresponding to the second pixel point comprises:
   calculating a direction angle function $\theta_S^n$ and an anisotropy function $u_S$ of the second pixel point according to the optimal contour template of the matching area of the first pixel point corresponding to the second pixel point, wherein the oriented function $\rho_{s*(k)}^n$ is indicated by the direction angle function $\theta_S^n$ and the anisotropy function $u_S$, $$\theta_S^n = L \int \nabla \varphi_S^\perp (k-n) dx$$

$$u_S = \min_{n \in N} \left| \int \nabla \varphi_S (k-n) dx \right|$$

wherein $\phi_S$ is the optimal contour template, $\nabla \phi_S^\perp$ indicates that $\phi_S$ is projected to a first axis and a second axis that are perpendicular to each other and then gradients are separately calculated in the directions of the first axis and the second axis that are perpendicular to each other, k is the first pixel point, N indicates a pixel point set in a neighbor area of the pixel point k, and n is a pixel point in the pixel point set.

3. The method according to claim 1, wherein the step of performing the local interpolation for the second pixel point according to the oriented function of the interpolation of the second pixel point comprises:
   performing the local interpolation for the second pixel point according to $$u_k(x) = v_k + \sum_{n \in N} c_n \rho_{s*(k)}^n (x-n),$$

wherein x is the second pixel point, k is the first pixel point, $u_k(x)$ is the intermediate pixel value of the second pixel point, $v_k$ is a pixel value of the first pixel point, N is a pixel point set in a neighbor area of x, n is a pixel point in the pixel point set, $c_n$ is an interpolation coefficient, and $\rho_{s*(k)}^n$ is an oriented function of an interpolation pixel point when an optimal contour template S*( ) is used.

4. An image enlargement method, comprising:
   inputting a low-resolution image, wherein the low-resolution image comprises matching areas and the matching areas are used to match all contour templates in a contour template set;
   searching one matching area for an optimal contour template;
   finding a second pixel point according to a zoom ratio and a first pixel point in the matching area, wherein the second pixel point is corresponding to the first pixel point;
   performing local interpolation for the second pixel point according to the optimal contour template, so as to obtain an intermediate pixel value;
   repeating the steps of searching one matching area, finding a second pixel point, and performing local interpolation until processing for all the matching areas is complete, and obtaining an initial high-resolution image according to all of the intermediate pixel values;
   performing global interpolation for the initial high-resolution image to obtain a high-resolution image; and
   wherein performing global interpolation for the initial high-resolution image to obtain a high-resolution image comprises:
   performing the global interpolation according to the formula $$u(x) = \sum_{k \in \square^2} w(x-k) u_k(x-k),$$

wherein x is the second pixel point, u(x) is a final pixel value of the second pixel point after the global interpolation, k is a pixel point in a neighbor area $\square^2$ of the pixel point x, w(x−k) is a weight value of a pixel point x−k, and $u_k$(x−k) is an intermediate pixel value of the pixel point x−k.

5. An image enlargement method, comprising:
inputting a low-resolution image, wherein the low-resolution image comprises matching areas and the matching areas are used to match all contour templates in a contour template set;
searching one matching area for an optimal contour template;
finding a second pixel point according to a zoom ratio and a first pixel point in the matching area, wherein the second pixel point is corresponding to the first pixel point;
performing local interpolation for the second pixel point according to the optimal contour template, so as to obtain an intermediate pixel value;
repeating the steps of searching one matching area, finding a second pixel point, and performing local interpolation until processing for all the matching areas is complete, and obtaining an initial high-resolution image according to all of the intermediate pixel values;
performing global interpolation for the initial high-resolution image to obtain a high-resolution image; and
optimizing the high-resolution image after the global interpolation according to a gradient contour variance of the high-resolution image after the global interpolation and a gradient contour variance of the low-resolution image, so as to obtain an optimized high-resolution image.

6. The method according to claim 5, wherein the step of optimizing the high-resolution image after the global interpolation according to a gradient contour variance of the high-resolution image after the global interpolation and a gradient contour variance of the low-resolution image comprises:
obtaining a change rate according to the gradient contour variance of the high-resolution image after the global interpolation and the gradient contour variance of the low-resolution image;
obtaining, through calculation, a target gradient field according to an original gradient field of the high-resolution image after the interpolation and the change rate;
reconstructing the high-resolution image after the global interpolation according to the target gradient field, so as to obtain an initial reconstructed high-resolution image;
compensating for a high-resolution image according to an iteration operation, the iteration operation comprising:
downsampling the high resolution image,
subtracting the low resolution image from the downsampled high-resolution image to obtain a first difference image,
upsampling the first difference image to obtain a second difference image, and adding the second difference image to the high-resolution image to obtain an after iteration high-resolution image;
repeating the iteration operation for the after iteration high-resolution image; and
obtaining the optimized high-resolution image, wherein an initial image of the high-resolution image before the iteration operation is performed is the initial reconstructed high-resolution image.

7. The method according to claim 6, wherein the step of obtaining a change rate according to the gradient contour variance of the high-resolution image after the global interpolation and the gradient contour variance of the low-resolution image comprises:
obtaining the change rate according to $$r(d) = \frac{\sigma_H}{\sigma_L},$$

wherein r(d) is the change rate, $\sigma_H$ is the gradient contour variance of the high-resolution image after the global interpolation, and $\sigma_L$ is the gradient contour variance of the low-resolution image.

8. The method according to claim 7, wherein the step of obtaining, through calculation, a target gradient field according to an original gradient field of the high-resolution image after the interpolation and the change rate comprises:
obtaining, through calculation, the target gradient field according to $\nabla I_t^T = r(d) \cdot \nabla I_s$, wherein $\nabla I_t^T$ is the target gradient field, r(d) is the change rate, and $\nabla I_s$ is the original gradient field of the high-resolution image after the interpolation.

9. The method according to claim 8, wherein the step of reconstructing the high-resolution image after the global interpolation according to the target gradient field comprises:
reconstructing the high-resolution image after the global interpolation according to $$I_H^{t_0} = w \cdot \frac{dx + dy}{2} + I_H,$$

wherein $I_H^{t_0}$ is the initial reconstructed high-resolution image, w is weight, dx and dy are direction gradients of $\nabla I_t^T$ on a first axis and a second axis, respectively, and $I_H$ is the high-resolution image after the global interpolation.

10. The method according to claim 9, wherein the step of compensating for a high-resolution image comprises:
compensating for the high-resolution image according to the formula $I_H^{t+1} = I_H^t + \tau \cdot ((I_H^t * G) \downarrow - I_l) \uparrow * G$, wherein $I_H^{t+1}$ is the high-resolution image after the iteration operation is performed, $I_H^t$ is the high-resolution image before the iteration operation is performed, an initial value of $I_H^t$ is $I_H^{t_0}$, τ is an iteration step size, G is the Gaussian kernel, $I_l$ is the low-resolution image, ↓ is downsampling, and ↑ is upsampling.

11. An image enlargement apparatus, comprising: an input module, a searching module, a corresponding module, a local interpolation module, and a global interpolation module, wherein:
the input module is configured to input a low-resolution image, wherein the low-resolution image comprises matching areas and the matching areas are used to match all contour templates in a contour template set, and send the low-resolution image to the searching module and the corresponding module;
the searching module is configured to search one of the matching areas for an optimal contour template, and send the optimal contour template to the local interpolation module;
the corresponding module is configured to receive the low-resolution image and find a second pixel point according to a zoom ratio and a first pixel point in the matching area, wherein the second pixel point is corresponding to the first pixel point, and send the second pixel point to the local interpolation module;
the local interpolation module is configured to receive the optimal contour template and the second pixel point, perform local interpolation for the second pixel point according to the optimal contour template, so as to obtain an intermediate pixel value, and obtain an initial high-resolution image according to all of the intermediate pixel values;

the global interpolation module is configured to receive the intermediate pixel values and perform global interpolation for the initial high-resolution image to obtain a high-resolution image; and wherein the local interpolation module is further configured to:

calculate an oriented function of an interpolation of the second pixel point according to an optimal contour template of a matching area of the first pixel point corresponding to the second pixel point, and perform the local interpolation for the second pixel point according to the oriented function of the interpolation of the second pixel point.

12. An image enlargement apparatus, comprising: an input module, a searching module, a corresponding module, a local interpolation module, and a global interpolation module, wherein:

the input module is configured to input a low-resolution image, wherein the low-resolution image comprises matching areas and the matching areas are used to match all contour templates in a contour template set, and send the low-resolution image to the searching module and the corresponding module;

the searching module is configured to search one of the matching areas for an optimal contour template, and send the optimal contour template to the local interpolation module;

the corresponding module is configured to receive the low-resolution image and find a second pixel point according to a zoom ratio and a first pixel point in the matching area, wherein the second pixel point is corresponding to the first pixel point, and send the second pixel point to the local interpolation module;

the local interpolation module is configured to receive the optimal contour template and the second pixel point, perform local interpolation for the second pixel point according to the optimal contour template, so as to obtain an intermediate pixel value, and obtain an initial high-resolution image according to all of the intermediate pixel values;

the global interpolation module is configured to receive the intermediate pixel values and perform global interpolation for the initial high-resolution image to obtain a high-resolution image; and wherein the local interpolation module is configured to calculate a direction angle function $\theta_S^n$ and an anisotropy function $u_S$ of the second pixel point according to the optimal contour template of the matching area of the first pixel point corresponding to the second pixel point, wherein the oriented function $\rho_{S^*(k)}^n$ is indicated by the direction angle function $\theta_S^n$ and the anisotropy function $u_S$, $$\theta_S^n = L \int \nabla \varphi_S^\perp (k-n) dx$$

$$u_S = \min_{n \in N} \left| \int \nabla \varphi_S (k-n) dx \right|$$

wherein $\phi_s$ is the optimal contour template, $\nabla \phi_S^\perp$ indicates that $\phi_s$ is projected to a first axis and a second axis that are perpendicular to each other and then gradients are separately calculated in the directions of the first axis and the second axis that are perpendicular to each other, k is the first pixel point, N indicates a pixel point set in a neighbor area of the pixel point k, and n is a pixel point in the pixel point set.

13. The apparatus according to claim 11, wherein the local interpolation module is configured to perform the local interpolation for the second pixel point according to $$u_k(x) = v_k + \sum_{n \in N} c_n \rho_{s^*(k)}^n (x-n),$$

wherein x is the second pixel point, k is the first pixel point, $u_k(x)$ is the intermediate pixel value of the second pixel point, $v_k$ is a pixel value of the first pixel point, N is a pixel point set in a neighbor area of x, n is a pixel point in the pixel point set, $c_n$ is an interpolation coefficient, and $\rho_{s^*(k)}^n$ is an oriented function of an interpolation pixel point when an optimal contour template $S^*(\ )$ is used.

14. The apparatus according to claim 11, wherein the local interpolation module is configured to perform the global interpolation according to the formula $$u(x) = \sum_{k \in \square^2} w(x-k) u_k (x-k),$$

wherein x is the second pixel point, u(x) is a final pixel value of the second pixel point after the global interpolation, k is a pixel point in a neighbor area $\square^2$ of the pixel point x, w(x−k) is a weight value of a pixel point x−k, and $u_k$(x−k) is an intermediate pixel value of the pixel point x−k.

15. An image enlargement apparatus, comprising: an input module, a searching module, a corresponding module, a local interpolation module, and a global interpolation module, wherein:

the input module is configured to input a low-resolution image, wherein the low-resolution image comprises matching areas and the matching areas are used to match all contour templates in a contour template set, and send the low-resolution image to the sea chin module and the corresponding module;

the searching module is configured to search one of the matching areas for an optimal contour template, and send the optimal contour template to the local interpolation module;

the corresponding module is configured to receive the low-resolution image and find a second pixel point according to a zoom ratio and a first pixel point in the matching area, wherein the second pixel point is corresponding to the first pixel point, and send the second pixel point to the local interpolation module;

the local interpolation module is configured to receive the optimal contour template and the second pixel point, perform local interpolation for the second pixel point according to the optimal contour template, so as to obtain an intermediate pixel value, and obtain an initial high-resolution image according to all of the intermediate pixel values;

the global interpolation module is configured to receive the intermediate pixel values and perform global interpolation for the initial high-resolution image to obtain a high-resolution image; and wherein the apparatus further comprises an optimizing module, wherein the optimizing module is configured to optimize the high-resolution image after the global interpolation according to a gradient contour variance of the high-resolution image after the global interpolation and a gradient contour variance of the low-resolution image, so as to obtain an optimized high-resolution image.

16. The apparatus according to claim 15, wherein the optimizing module is configured to:
obtain a change rate according to the gradient contour variance of the high-resolution image after the global interpolation and the gradient contour variance of the low-resolution image;
obtain, through calculation, a target gradient field according to an original gradient field of the high-resolution image after the interpolation and the change rate;
reconstruct the high-resolution image after the global interpolation according to the target gradient field, so as to obtain an initial reconstructed high-resolution image;
compensate for a high-resolution image according to an iteration operation, the iteration operation comprising:
    downsampling the high resolution image,
    subtracting the low resolution image from the downsampled high resolution image to obtain a first difference image,
    upsampling the first difference image to obtain a second difference image, and
    adding the second difference image to the high-resolution image to obtain an after iteration high-resolution image;
repeat the iteration operation for the after iteration high-resolution image; and obtain the optimized high-resolution image, wherein an initial image of the high-resolution image before the iteration operation is performed is the initial reconstructed high-resolution image.

17. The apparatus according to claim 16, wherein the optimizing module is configured to obtain the change rate according to $$r(d) = \frac{\sigma_H}{\sigma_L},$$

wherein r (d) is the change rate, $\sigma_H$ is the gradient contour variance of the high-resolution image after the global interpolation, and $\sigma_L$ is the gradient contour variance of the low-resolution image.

18. The apparatus according to claim 17, wherein the optimizing module is configured to obtain, through calculation, the target gradient field according to $\nabla I_t^T = r(d) \cdot \nabla I_s$, wherein $\nabla I_t^T$ is the target gradient field, r(d) is the change rate, and $\nabla I_s$ is the original gradient field of the high-resolution image after the interpolation.

19. The apparatus according to claim 18, wherein the optimizing module is configured to reconstruct the high-resolution image after the global interpolation according to $$I_H^{t_0} = w \cdot \frac{dx + dy}{2} + I_H,$$

wherein $I_H^{t_0}$ is the initial reconstructed high-resolution image, w is weight, dx and dy are direction gradients of $\nabla I_t^T$ on a first axis and a second axis, respectively, and $I_H$ is the high-resolution image after the global interpolation.

20. The apparatus according to claim 19, wherein the optimizing module is configured to compensate for the high-resolution image according to the formula $I_H^{t+1} = I_H^t + \tau \cdot ((I_H^t * G) \downarrow - I_l) \uparrow * G$, wherein $I_H^{t+1}$ is the high-resolution image after the iteration operation is performed, $I_H^t$ is the high-resolution image before the iteration operation is performed, an initial value of $I_H^t$ is $I_H^{t_0}$, $\tau$ is an iteration step size, G is the Gaussian kernel, $I_l$ is the low-resolution image, $\downarrow$ is downsampling, and $\uparrow$ is upsampling.

* * * * *